US010337650B2

(12) United States Patent
Chan et al.

(10) Patent No.: US 10,337,650 B2
(45) Date of Patent: Jul. 2, 2019

(54) CABLE MANAGEMENT SYSTEM FOR TELESCOPING ASSEMBLY

(71) Applicant: Mobile Tech, Inc., Lake Oswego, OR (US)

(72) Inventors: Nomis Chan, Kowloon (HK); Wing Hang Chu, Kowloon (HK)

(73) Assignee: MOBILE TECH, INC., Lake Oswego, OR (US)

( * ) Notice: Subject to any disclaimer, the term of this patent is extended or adjusted under 35 U.S.C. 154(b) by 0 days.

(21) Appl. No.: 15/493,109

(22) Filed: Apr. 20, 2017

(65) Prior Publication Data

US 2018/0306348 A1    Oct. 25, 2018

(51) Int. Cl.
| *F16L 3/01* | (2006.01) |
| *F16M 11/28* | (2006.01) |
| *H02G 3/04* | (2006.01) |
| *H02G 11/00* | (2006.01) |

(52) U.S. Cl.
CPC .............. *F16L 3/01* (2013.01); *F16M 11/28* (2013.01); *H02G 3/0493* (2013.01); *H02G 11/00* (2013.01)

(58) Field of Classification Search
CPC . F16L 3/01; F16L 3/015; H02G 11/00; F16M 11/046; F16M 11/26
See application file for complete search history.

(56) References Cited

U.S. PATENT DOCUMENTS

| 2,875,496 A | * | 3/1959 | Fox | B60D 1/62 |
| | | | | 24/132 R |
| 3,339,768 A | * | 9/1967 | Dixon | B66F 9/08 |
| | | | | 187/228 |
| 3,822,051 A | * | 7/1974 | Karapita | F16B 7/10 |
| | | | | 248/333 |
| 3,936,026 A | * | 2/1976 | Hampel | F16M 11/08 |
| | | | | 248/349.1 |
| 5,316,260 A | * | 5/1994 | Johnston | A61B 3/18 |
| | | | | 248/123.2 |

(Continued)

FOREIGN PATENT DOCUMENTS

| DE | 1808335 A1 * | 6/1970 | ............. F16L 3/015 |
| DE | 202005013508 U1 | 11/2005 | |

(Continued)

OTHER PUBLICATIONS

International Search Report for PCT/US2017/028702 dated Dec. 19, 2017.

(Continued)

*Primary Examiner* — Eret C McNichols
(74) *Attorney, Agent, or Firm* — Thompson Coburn LLP

(57) ABSTRACT

Example implementations relating to a cable management system are disclosed herein that may be utilized, in whole or in part, in or with a telescoping assembly. Briefly, a cable assembly may comprise a cable body and a plurality of segments defined via one or more stoppers fixedly disposed on the cable body. The cable assembly may be routed through inner and outer sections of the telescoping assembly and may be retained via cable support members arranged within the sections such that a particular predetermined segment of the plurality of segments is bendable during telescoping movements, such as in a controlled manner.

15 Claims, 13 Drawing Sheets

(56) References Cited

U.S. PATENT DOCUMENTS

| | | | | |
|---|---|---|---|---|
| 5,335,142 | A * | 8/1994 | Anderson | F16M 11/10 248/183.2 |
| 5,611,513 | A * | 3/1997 | Rosen | F16M 11/10 248/222.11 |
| 6,268,997 | B1 * | 7/2001 | Hong | F16M 11/10 248/398 |
| 6,286,794 | B1 * | 9/2001 | Harbin | A47B 21/02 248/123.2 |
| 6,767,115 | B2 * | 7/2004 | Blackwelder | B60P 3/18 362/385 |
| 7,857,481 | B2 * | 12/2010 | Oh | B60Q 7/00 362/198 |
| 8,288,973 | B2 * | 10/2012 | Ford | E04H 12/182 318/266 |
| 8,695,286 | B2 * | 4/2014 | Falck-Schmidt | H01Q 1/1235 52/114 |
| 8,816,525 | B2 * | 8/2014 | Okumura | B60R 16/027 248/65 |
| 8,896,656 | B2 * | 11/2014 | Epstein | H04N 5/268 348/14.07 |
| 9,039,016 | B2 * | 5/2015 | Abernethy | B62B 3/02 280/6.15 |
| 9,781,859 | B1 * | 10/2017 | Wishman | H05K 7/1491 |
| 9,822,921 | B2 * | 11/2017 | Chen | F16M 11/041 |
| 2005/0213290 | A1 * | 9/2005 | Lauffer | G06F 1/1601 361/679.21 |
| 2008/0078879 | A1 * | 4/2008 | Weaver | B64D 15/12 244/131 |
| 2013/0015300 | A1 * | 1/2013 | Klinke | A47B 9/20 248/49 |
| 2014/0251726 | A1 * | 9/2014 | Ditty | F16L 3/015 182/69.4 |
| 2016/0131279 | A1 * | 5/2016 | Kemp | F16L 3/015 248/55 |
| 2016/0360637 | A1 * | 12/2016 | Harvilchuck | H05K 7/1491 |
| 2017/0030485 | A1 * | 2/2017 | Whiteside | A47F 9/04 |
| 2017/0041696 | A1 * | 2/2017 | Levine | H04R 1/1033 |
| 2017/0051866 | A1 * | 2/2017 | Chen | F16M 11/041 |
| 2018/0038517 | A1 * | 2/2018 | Ditty | F16L 3/015 |
| 2018/0063987 | A1 * | 3/2018 | Chen | H05K 7/1491 |
| 2018/0184800 | A1 * | 7/2018 | Yamamoto | A47B 9/20 |

FOREIGN PATENT DOCUMENTS

| | | |
|---|---|---|
| DE | 102014103620 A1 | 9/2015 |
| EP | 2397404 A2 | 12/2011 |
| WO | 2006/052747 A2 | 5/2006 |

OTHER PUBLICATIONS

DE102014103620 Machine Translation into English, published Sep. 17, 2015, 17 pages.

DE202005013508 Machine Translation into English, published Nov. 10, 2005, 10 pages.

* cited by examiner

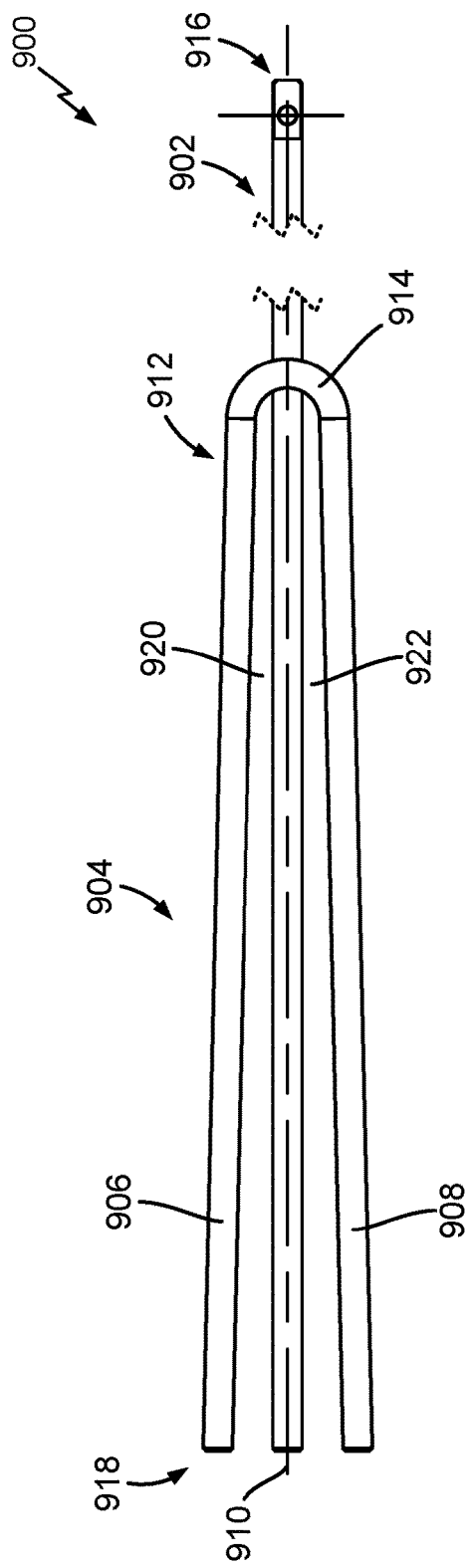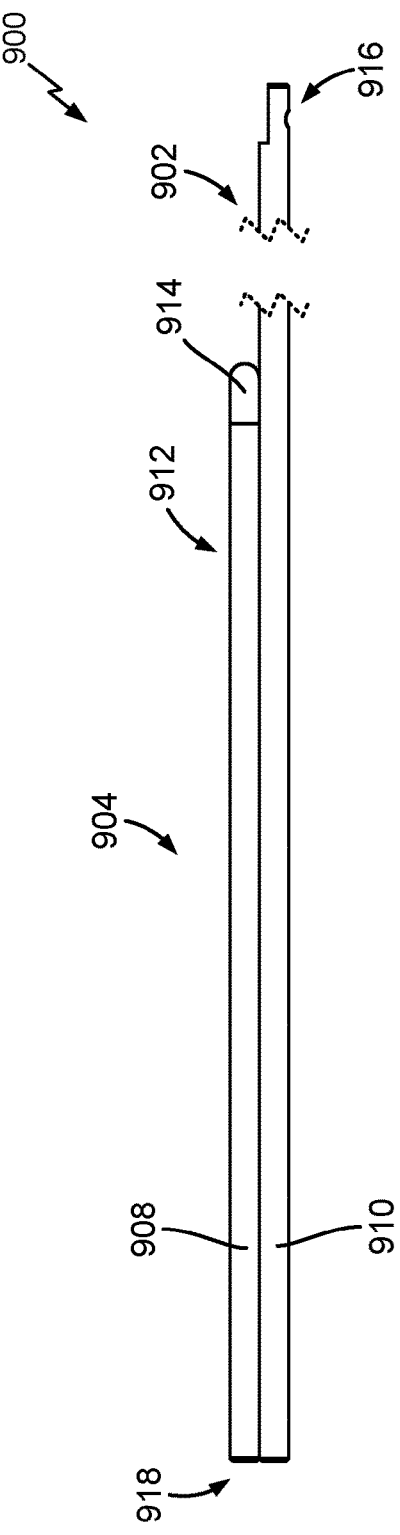
FIG. 9B
FIG. 9C

CABLE MANAGEMENT SYSTEM FOR TELESCOPING ASSEMBLY

BACKGROUND

1. Field

The present disclosure relates generally to cable management systems and, more particularly, to a cable management system for use in or with a telescoping assembly.

2. Information

Various devices, such as computer stands, monitor mounts, video remote interpreting (VRI) carts, or the like may include built-in telescoping assemblies, such as in the form of one or more retractable poles or like sections, for example, that may allow to adjust an associated monitor, speaker, keyboard, work area, tablet computer, etc. to a suitable height, position, etc. In some instances, one or more non-load-bearing cables, such as signal, electrical, power, or like cables may run inside telescoping assemblies, such as throughout a number of associated sections, for example, in order to interconnect various electrical or like components located in different portions of a device. At times, interior cables may be prone to damage, such as snapping, breakage, etc., which may be due, at least in part, to frequent bending, chafing or rubbing against inner walls, edges, other cables, etc. during repetitive extension and retraction of telescoping sections during a typical or normal operation of a device. Repairing, rerouting, reinstalling, etc. a cable located inside a telescoping assembly may involve partially or completely disassembling the assembly and/or associated device. This may be labor-intensive, may cause expensive delays, may interrupt or reduce a service life and/or operation of a device and/or associated assembly, or the like. Accordingly, how to prevent or reduce damage to a cable, such as routed through a relatively confined space of a telescoping assembly, for example, continues to be an area of development.

BRIEF DESCRIPTION OF THE DRAWINGS

Non-limiting and non-exhaustive aspects are described with reference to the following figures, wherein like reference numerals refer to like parts throughout the various figures unless otherwise specified.

FIGS. 9A-9C are perspective, front, and side views of an example implementation a cable guide.

SUMMARY

Figure 1:
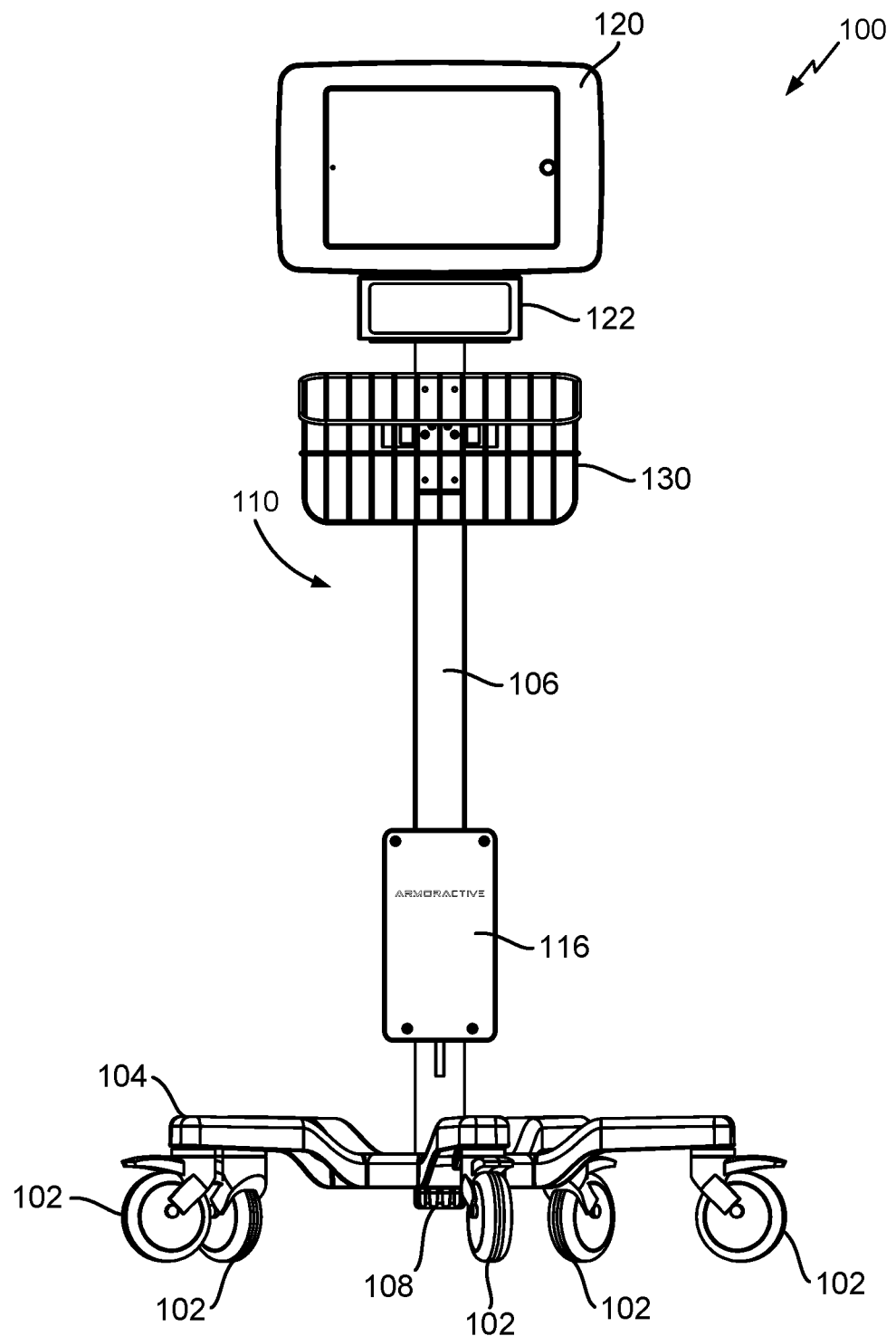
FIGS. 1-3 are schematic diagrams of a front, back, and side views of an example implementation of a cart associated with a telescoping assembly.

Example implementations relate to a cable management system for use in or with a telescoping assembly. In one implementation, a cable management system may comprise an outer section; an inner section slidably mounted in the outer section for telescoping movements, the outer and the inner sections having respective proximal and distal ends, the proximal end of the inner section being received in the distal end of the outer section; and a cable assembly routed through the outer and the inner sections, the cable assembly having a plurality of segments and being retained via cable support members arranged within the telescoping assembly such that a predetermined segment of the plurality of segments is bendable during the telescoping movements.

In another implementation, a cable management system may comprise a system for use in a telescoping assembly of a type capable of telescoping movements via raising or lowering an inner section about a vertical axis, the telescoping assembly may further comprise an outer section and the inner section mounted in the outer section for the telescoping movements, the outer and the inner sections having respective proximal and distal ends, the proximal end of the inner section being received in the distal end of the outer section; and a cable assembly routed through the outer and the inner sections, the cable assembly comprising a cable body and a plurality of segments having respective lengths at least partially defined via one or more stoppers fixedly disposed on the cable body, the cable assembly being retained via a plurality of cable support members arranged within the telescoping assembly such that a particular predetermined segment of the plurality of segments is bent during the telescoping movements in a controlled manner.

In yet another implementation, a cable assembly for use with a telescoping assembly may comprise a flexible cable body; and one or more stoppers fixedly disposed on the flexible cable body at one or more predetermined locations and adapted to cooperate with one or more cable support members of the telescoping assembly so as to facilitate bending of a portion of the flexible cable body in a controlled manner. It should be understood, however, that these are merely example implementations, and that claimed subject matter is not limited to these particular implementations.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, methods, assemblies, and/or components thereof that would be known by one of ordinary skill have not been described in detail so as not to obscure claimed subject matter.

Some example implementations relating to a cable management system for use in or with a telescoping assembly are disclosed herein. In this context, the terms "telescoping sections," "telescoping assembly," or simply "assembly" may be used interchangeably and refer to an assembly comprising a plurality of sections or like structures having progressively different cross-sections (e.g., smaller cross-sections, etc.) nested within each other and capable of telescoping movements relative to each other. As used herein, "telescoping movement" refers to a sliding movement of one or more sections of a telescoping assembly, such as an inner section, for example, in relation to another section of the assembly, such as an outer section, for example, or vice versa. As a way of illustration, a telescoping movement of an inner section out of an outer section may lengthen a telescoping assembly, for example, and a telescoping movement of an inner section into an outer section may shorten the assembly, for example.

As alluded to previously, telescoping assemblies may, for example, be implemented in connection with a variety of devices, such as computer stands, monitor mounts and/or arms, or the like, such as for purposes of adjusting a device or a portion thereof to a suitable length, height, position, etc. At times, one or more cables, such as non-load-bearing cables (e.g., power, data, etc.) interconnecting various electrical or like components located in different portions of a device may, for example, be disposed on the interior of a telescoping assembly, such as routed through a number of associated sections, as was also indicated. In some instances, during normal or typical operation of a telescoping assembly and/or associated device, repetitive telescoping movements, such as via continual extension and retraction of one or more sections for height, length, position, etc. adjustments, for example, may damage a cable or a portion thereof located within the interior of the assembly, which may lead to and/or require time-consuming, labor-intensive, costly, etc. maintenance and/or repair. Accordingly, it may be desirable to develop one or more systems and/or apparatuses that may implement a more effective and/or more efficient cable management system for use in or with a telescoping assembly, such as via facilitating bending of an interior cable or a portion thereof in a controlled manner during telescoping movements, for example.

As was also indicated, in at least one implementation, a telescoping assembly may be implemented, at least in part, in or with a cart, such as a video remote interpreting (VRI) cart, as one example, so as to enable adjustments of an associated monitor, speaker, tablet computer, or other components to a height, position, etc. that allows a user to more clearly see and/or hear an on-screen sign language interpreter, health care provider, or the like. Claimed subject matter is not so limited, of course. For example, any other suitable cart, device, etc., medical or otherwise, that may utilize cabling routed through the interior of an associated telescoping assembly may be employed herein, such as without deviating from the scope and/or spirit of claimed subject matter.

Figure 2:
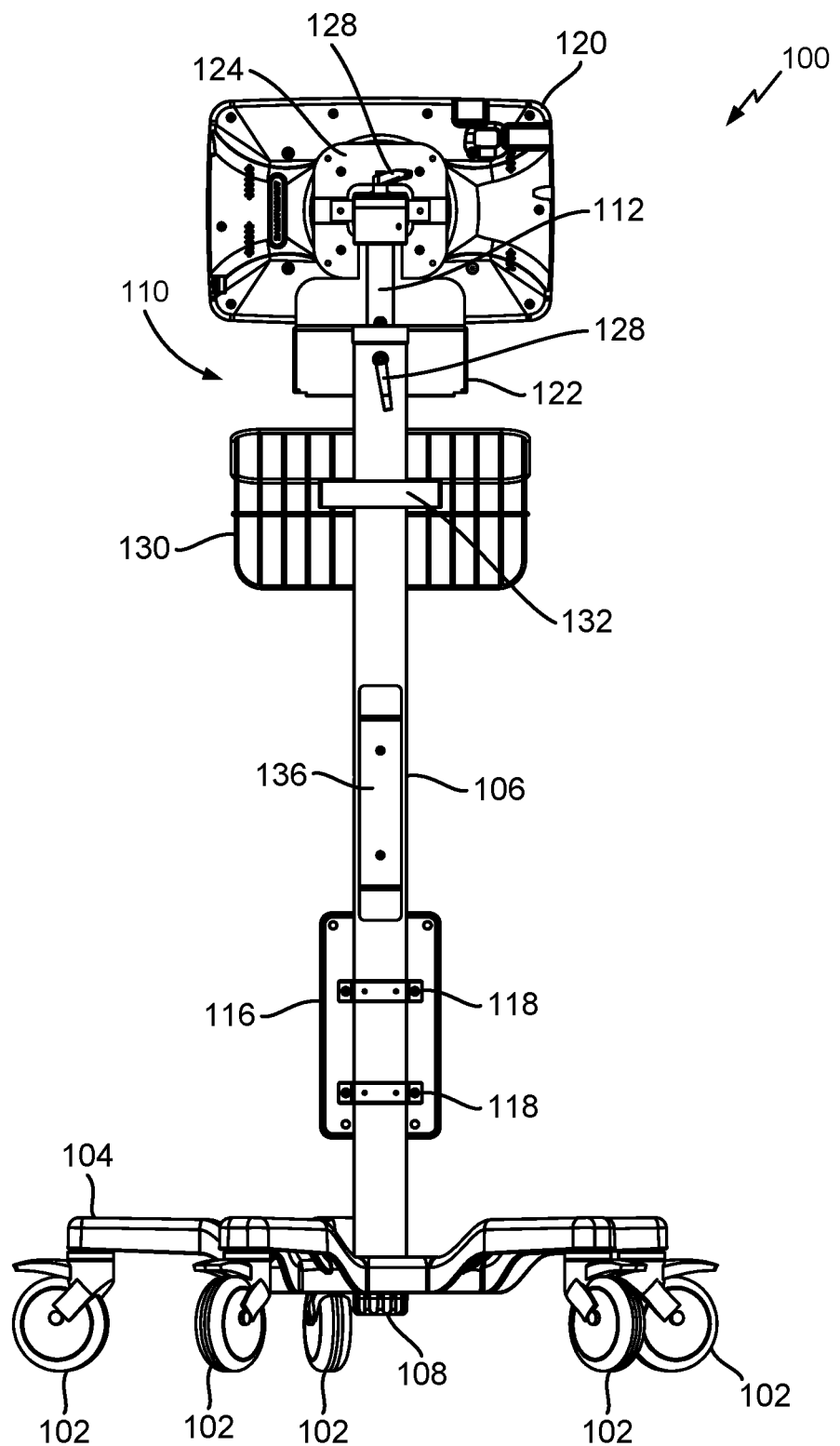
Figure 3:
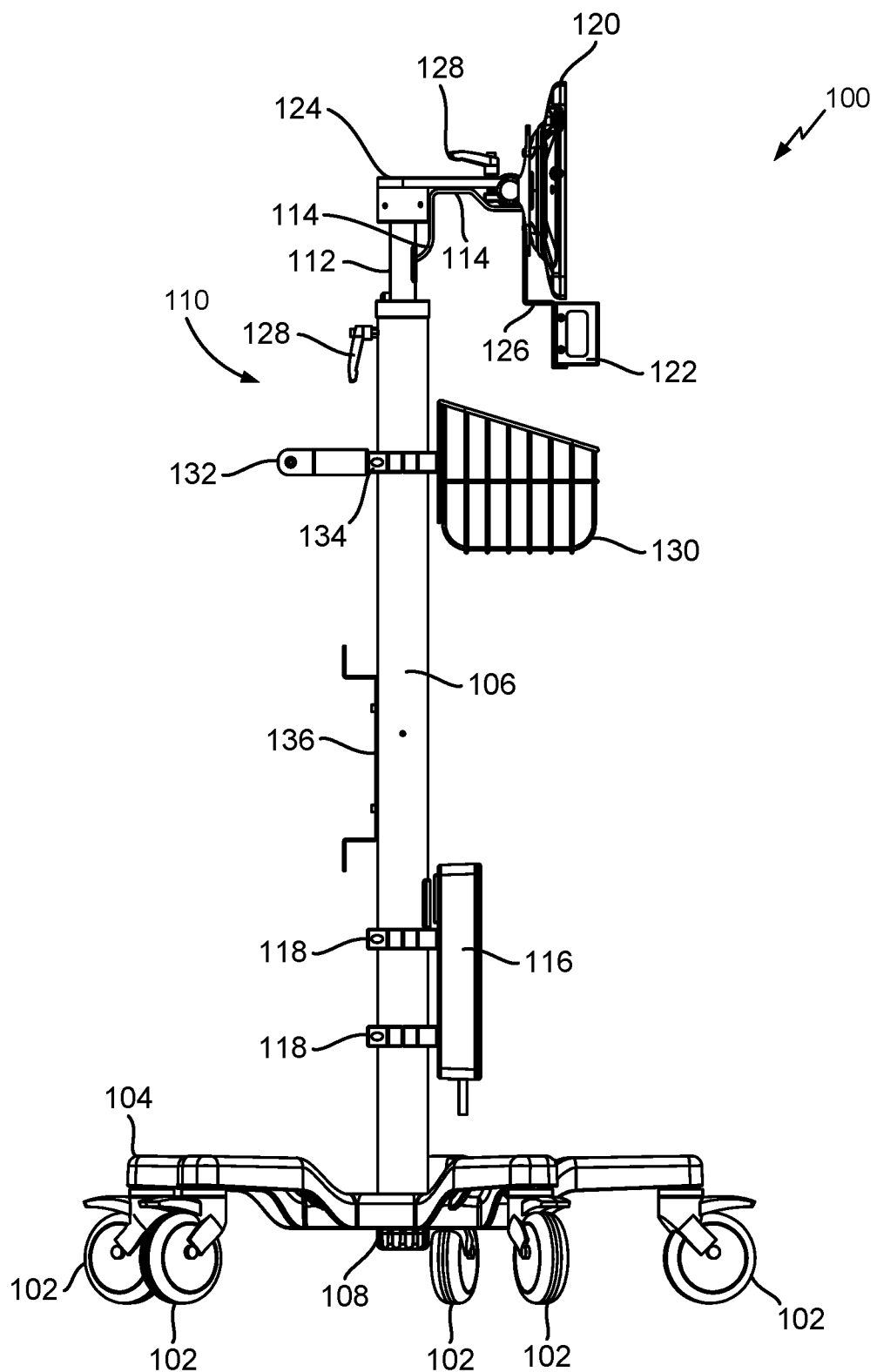

A particular implementation of a VRI cart, referenced herein at 100, which may be used, in whole or in part, to implement a cable management system, such as discussed herein, for example, is illustrated in schematic diagrams of FIGS. 1-3 showing a front, back, and side views of VRI cart 100, respectively. It should be noted that like numerals may designate like parts throughout FIGS. 1-3, as well as other figures of the present disclosure, such as to indicate corresponding and/or analogous structures, components, etc. It should also be appreciated that structures, components, etc. illustrated have not necessarily been drawn to scale, such as for simplicity and/or clarity of illustration. For example, dimensions of some components may be exaggerated relative to other components. Further, it is to be understood that other embodiments may be utilized. Furthermore, structural and/or other changes may be made without departing from the scope and spirit of claimed subject matter. It should also be noted that directions and/or references, such as, for example, up, down, top, bottom, and so on, if applicable or appropriate, may be used to facilitate and/or support discussion and are not intended to restrict application of claimed subject matter. Therefore, the following detailed description is not to be taken to limit claimed subject matter and/or equivalents.

As seen, VRI cart 100 may comprise, for example, a mobile or so-called "rolling" cart capable of being moved around a surface (e.g., a floor, etc.) within a suitable environment (e.g., a health care establishment, interpreter services establishment, etc.), such as via a plurality of caster wheels 102 that may be rotatably attached to a base 104 via any suitable attachment means. Base 104 may, for example, be anchored to one end of a lower pole 106, such as via a screw 108, for example. As illustrated, here, lower pole 106 may comprise, for example, an outer section of a telescoping assembly 110 associated with VRI cart 100. Lower pole 106 may, for example, be in sliding engagement with an upper pole 112, which may comprise an inner section of telescoping assembly 110. Particular examples of inner and outer sections as well as associated components, structures, etc. will be discussed in greater detail below. As seen, upper pole 112 may nest within lower pole 106, such as by virtue of having a smaller diameter, for example, so as to allow for telescoping movements of upper pole 112 relative to lower pole 106, for this particular implementation. Thus, as also seen, in some instances, a particular telescoping assembly, such as telescoping assembly 110 associated with VRI cart 100, for example, may be of a type capable of telescoping movements about a vertical axis, such as via extension or retraction of upper pole 112, thus, making telescoping assembly 110 longer or shorter, respectively. At times, upper pole 112 of telescoping assembly 110 may also be capable of rotational movements about a horizontal axis, such as in relation to lower pole 106, for example.

As particularly seen in FIG. 3, VRI cart 100 may further comprise, for example, a cable assembly 114 that may be routed through telescoping assembly 110 or any suitable portion thereof, such as to interconnect one or more electrical or like components located in different portions of VRI cart 100. For this particular implementation, cable assembly 110 may, for example, interconnect one or more components located inside a power hub housing 116, which may be attached to lower pole 106 via one or more collars 118, as one possible example, with a tablet computer 120 and/or speaker 122, which may be attached to upper pole 112 via respective mounts 124 and 126. As also illustrated, VRI cart 100 may comprise, for example, one or more levers, referenced generally at 128, such as to securely hold one or more components of VRI cart 100 (e.g., upper pole 106, tablet computer 120, etc.) at a suitable position, angle, height, etc., such as via friction, for example. As also seen, VRI cart 100 may include a basket 130, such as for holding suitable items, for example, and a handle 132, such as for moving VRI cart 100 around a suitable surface. Basket 130 and handle 132 may, for example, be fixedly attached to lower pole 106 via a collar 134 using any suitable attachment means (e.g., screws, bolts, etc.). In some instances, VRI cart 100 may also include a cord wrap or like structure, referenced generally at 136, for example, such as for wrapping, coiling, etc. any suitable cable, cord, etc., if suitable or desired. Again, it should be noted that, even though VRI cart 100 and/or telescoping assembly 110 is illustrated herein as having a particular configuration, components, attachments, etc., VRI cart 100 and/or telescoping assembly 110 may, for example, be implemented via any other suitable configuration, components, attachments, or the like.

Figure 4:
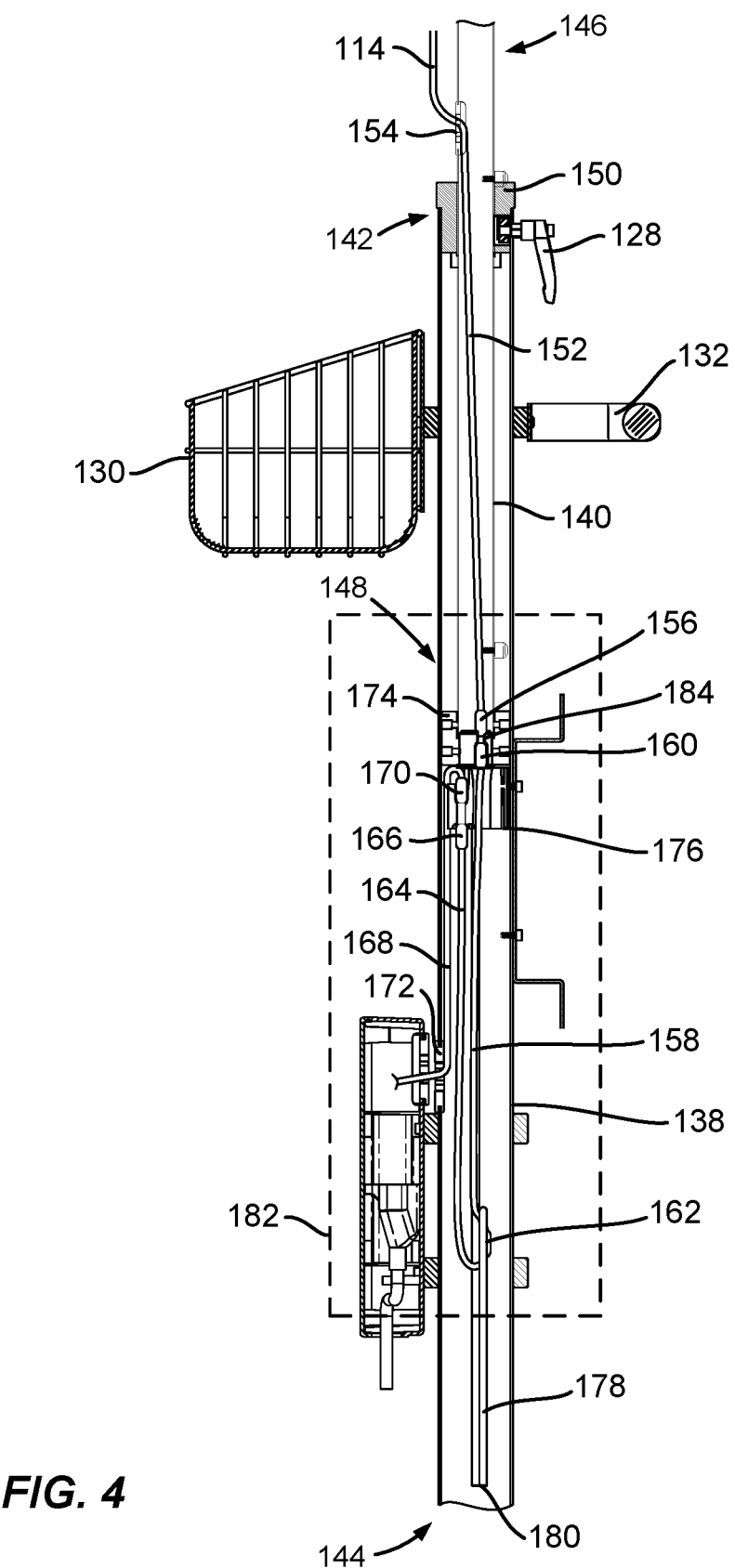
FIG. 4 is an axial cross-sectional view of an example implementation of a telescoping assembly.

Attention is now drawn to FIG. 4, which is an axial cross-sectional view of an example implementation of a telescoping assembly, such as telescoping assembly 110 associated with VRI cart 100 illustrated in FIGS. 1-3, for example. As seen, telescoping assembly 110 may comprise, for example, an outer section 138 and an inner section 140 that may be slidably mounted in outer section 138 for relative telescoping movements, as was previously discussed. Outer section 138 and inner section 140 of telescoping assembly 110 may have respective proximal and distal ends. For example, outer section 138 may have a distal end 142 and a proximal end 144, and inner section 140 may have a distal end 146 and a proximal end 148. Thus, for this example implementation of telescoping assembly 110, proximal end 148 of inner section 140 may, for example, be received in distal end 142 of outer section 138, such as to facilitate telescoping movements. As also seen, inner section 140 may, for example, be slidably secured in outer section 138 via a guiding block 150 retainably housed in distal end 142 of outer section 138. In some instances, guiding block 150 may, for example, be attached to an inner surface of outer section 138, such as via any suitable attachment means (e.g., a screw, via a friction fit, lever 128, etc.). As such, in at least one implementation, telescoping assembly 110 may be capable of telescoping movements about a vertical axis, for example, and/or rotational movements about a horizontal axis, as was indicated. Again, claimed subject matter is not limited to a particular device, assembly, movements, attachment means, etc., of course.

Figure 5:
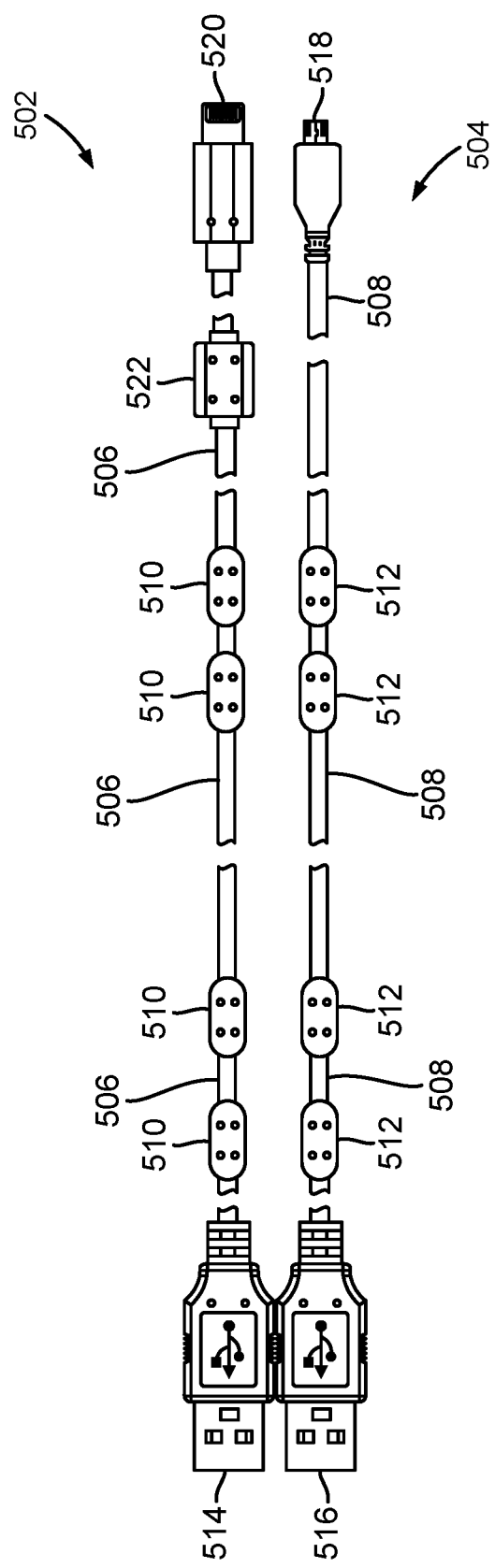
FIG. 5 is an illustrative view of example implementations of cable assemblies.

As also illustrated, telescoping assembly 110 may comprise, for example, a cable assembly 114 that may be routed through inner and outer sections 140 and 138, or any portion and/or combination thereof. Cable assembly 114 may comprise, for example, a non-load-bearing cable, such as power, signal, data, or like cable that may be connectable to one or more sources of an electrical signal. FIG. 5 is an illustrative view of two example implementations of cable assemblies, referenced herein via arrows at 502 and 504, that may be used, in whole or in part, in connection with a telescoping assembly, such as telescoping assembly 110 of FIG. 4, for example. As seen, in some instances, cable assemblies 502 and 504 may comprise, for example, unibody cable structures having respective cable bodies 506 and 508 and one or more stoppers, referenced generally at 510 and 512, fixedly disposed on cable bodies 506 and 508, respectively, at predetermined locations. A stopper, such as stopper 510 and/or 512 may comprise, for example, any suitable structure having a transverse dimension or cross-section (e.g., a diameter, width, etc.) larger than a transverse dimension of an associated cable body (e.g., a diameter, width, etc.), such as cable body 506 and/or 508. As will be seen, a larger transverse dimension or cross-section of stoppers 510 and/or 512 may facilitate retention of an associated cable assembly within telescoping assembly 110, as will be seen. In one particular implementation, a plurality of stoppers made of thermoplastic material, such as polyvinyl chloride (PVC) overmolded into a particular cable body at a number of predetermined locations were used. Of course, claimed subject matter is not limited in this regard.

As also seen, in an implementation, cable assemblies 502 and 504 may comprise, for example, a number of suitable connectors, such as a Universal Serial Bus (USB) connector, referenced at 514 (e.g., for cable assembly 502) and 516 (e.g., for cable assembly 504), micro USB connector, referenced at 518, iPhone® connector, referenced at 520, just to illustrate a few possible implementations. These or like connectors may, for example, be positioned at respective terminal ends of cable assemblies 502 and 504, and may be sized to join with one or more suitable outlets, ports, plugs, sockets, adapters, or the like, such as to connect cable assemblies 502 and 504 to one or more sources of an electrical signal, as was indicated. As also illustrated, in some instances, a particular cable assembly, such as cable assembly 502, for example, may include a suitable circuit assembly (e.g., a printed circuit board assembly (e.g., PCBA), etc.), referenced at 522. Again, it should be noted that these are merely example details relating to particular implementations of cable assemblies that may be used, in whole or in part, in connection with a telescoping assembly (e.g., telescoping assembly 110 of FIG. 4, etc.), such as discussed herein, and that claimed subject matter is not limited in this regard. For example, cable assemblies 502 and 504 may comprise any other suitable connectors, PCBAs, stoppers, etc. or any suitable number of connectors, PCBAs, stoppers, etc. As discussed below, a cable assembly, such as cable assembly 502 and/or 504, for example, may cooperate with one or more components of an associated telescoping assembly (e.g., telescoping assembly 110 of FIG. 4, etc.), such as to facilitate bending of a predetermined segment of a cable assembly in a controlled manner during telescoping movements.

Thus, referring now back to telescoping assembly 110 of FIG. 4, in an implementation, cable assembly 110 may comprise, for example, a plurality of segments, which may or may not be contiguous. In some instances, segments may, for example, have respective lengths defined via one or more stoppers and/or one or more cable support members. To illustrate, for this particular example, cable assembly 110 may comprise, for example, a first segment 152, such as having a length defined via cable support member 154 and a stopper 156, a second segment 158, such as having a length defined via a stopper 160 and a stopper 162, a third segment 164, such as having a length defined via stopper 162 and a stopper 166, and a fourth segment 168, such as having a length defined via a stopper 170 and cable support member 172. Again, claimed subject matter is not limited to particular segments shown.

As was indicated, in an implementation, cable assembly 114 may be fixedly retained within telescoping assembly 110 via a number of cable support members, such as cable support members 154, 174, 176, 178, and 172, for example. As seen and as will be discussed in greater detail below, cable support members 154, 174, 176, 178, and 172 may, for example, be arranged within telescoping assembly 110 substantially longitudinally, such that a predetermined segment of a plurality of segments 152, 158, 164, and 168 is bendable during telescoping movements of inner section 140, such as in a controlled manner. As was discussed, at times, this may, for example, prevent or reduce damage to cable assembly 114 or a portion thereof during telescoping movements. Particular implementations of cable support members will now be discussed, such as by way of non-limiting examples.

Thus, according to an implementation, cable support members 154 and 172 may comprise, for example, cable retainers having respective through-apertures aligned with through-apertures in suitable portions of walls of inner and outer sections 140 and 138. As illustrated, these through-apertures may, for example, be sized for conducting cable assembly 114 therethrough, such as for purposes of connecting cable assembly 114 to one or more sources of an electrical signal, as was indicated. At times, cable support members 154 and 172 may, for example, be capable of fixedly securing or anchoring respective ends or other portions of cable assembly 114 to telescoping assembly 110, such as via a friction fit, as one possible example. As seen, in this example, cable support member 172 anchoring one end of cable assembly 114 may be positioned at a suitable distance from proximal end 144 of outer section 138, such as at a mid-point between a middle portion of outer section 138 and its distal end 144, just to illustrate one possible implementation. As also seen, in some instances, cable support member 154 anchoring another end of cable assembly 114 may, for example, be positioned proximate to distal end 146 of inner section 140, though, again, claimed subject matter is not so limited. For example, cable support members 154 and 172 may be positioned at any other suitable locations on inner and outer sections 140 and 138, cable assembly 114 may be anchored to telescoping assembly 110 via any other suitable attachment means, or the like.

In an implementation, cable support member 174 may comprise, for example, a guiding block fixedly mounted to an outside surface of inner section 140, such as via any suitable attachment means (e.g., screws, friction, etc.). In some instances, cable support member 174 may, for example, be mounted proximate to proximal end 148 of inner section 140, such as for functioning conjointly with inner section 140 during telescoping movements. As such, cable support member 174 may, for example, slidably travel between cable support member 176 and guiding block 150, such as during telescoping movements of telescoping assembly 110, as will also be seen.

Continuing with the above discussion, in an implementation, cable support member 176 may comprise, for example, a retainer fixedly mounted via any suitable means to an inside surface of outer section 138, such as at a suitable distance from distal end 142 of outer section 138 and/or guiding block 150. In some instances, cable support member 176 may comprise, for example, a retainer adapted to conduct cable assembly 114 therethrough while fixedly retaining at least a portion of cable assembly 114 within telescoping assembly 110, such as via one or more stoppers (e.g., stoppers 166, 170). Thus, as discussed below, cable support member 176 may comprise, for example, one or more apertures sized to at least partially receive one or more stoppers disposed on cable assembly 114. As particularly seen in FIG. 6, which is an enlarged axial cross-sectional view of telescoping assembly 110 of FIG. 4, such as referenced in FIG. 4 via a dashed line at 182, cable support member 176 may, for example, conduct cable assembly 114 therethrough while fixedly retaining at least a portion of cable assembly 114 via one or more stoppers sized to be at least partially received in one or more apertures of cable support member 176 (e.g., stoppers 166 and 170).

Figure 6:
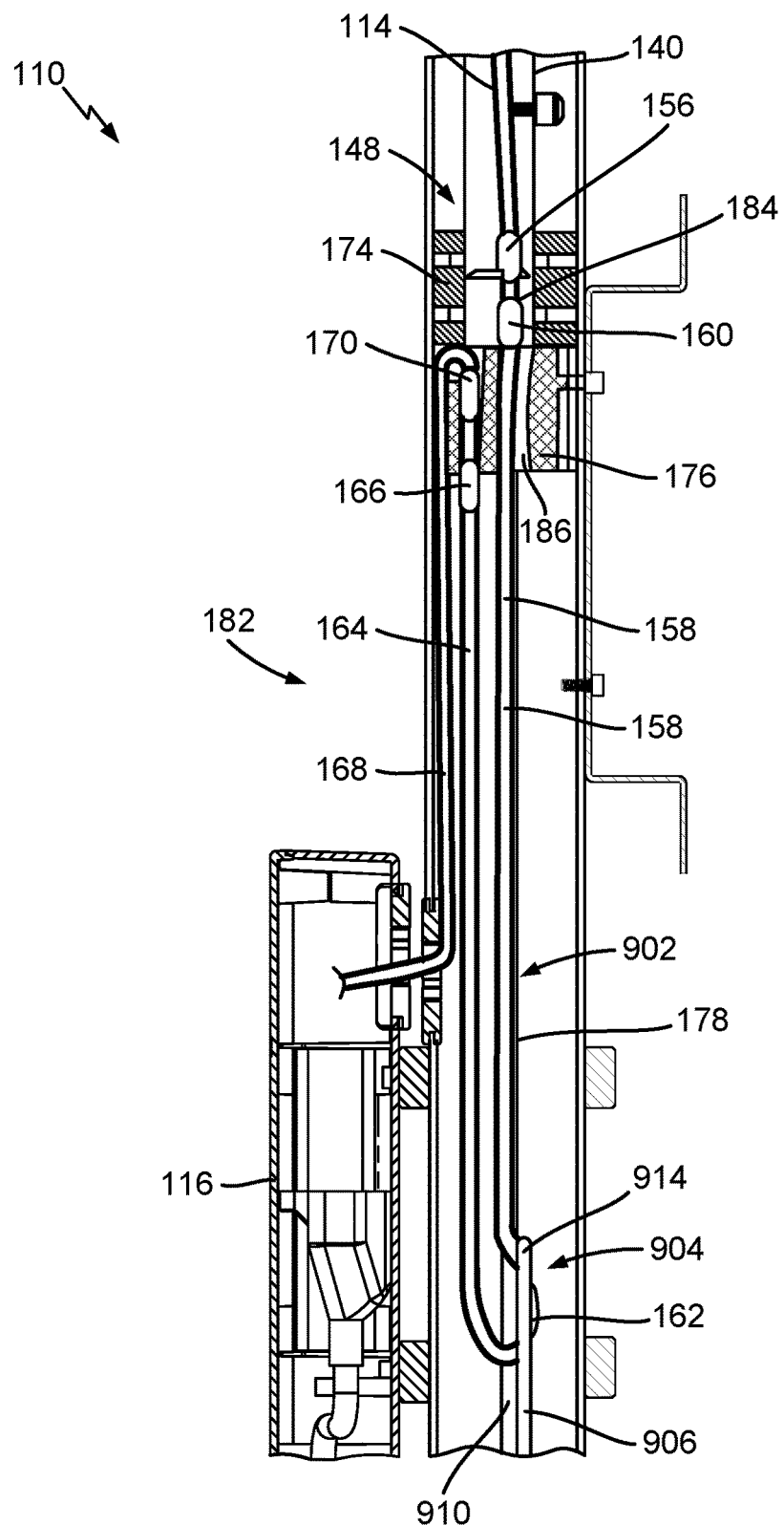
FIG. 6 is an axial cross-sectional view of an enlarged portion of an example implementation of telescoping assembly of FIG. 4.
Figure 7A:
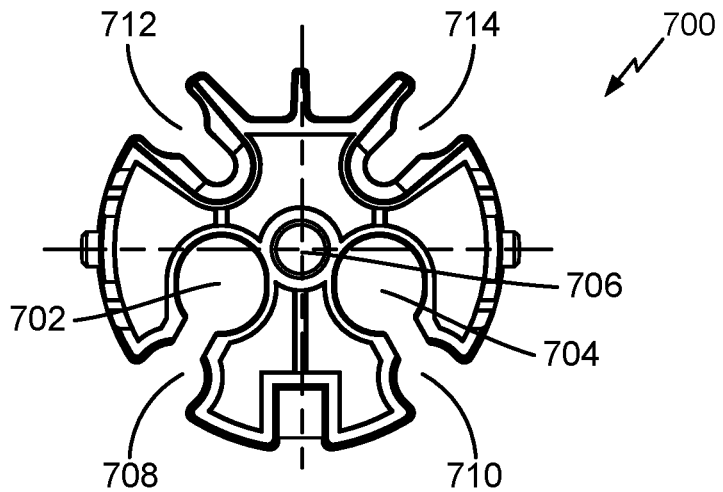
FIGS. 7A and 7B are axial and perspective views of an example implementation of a retainer.
Figure 7B:
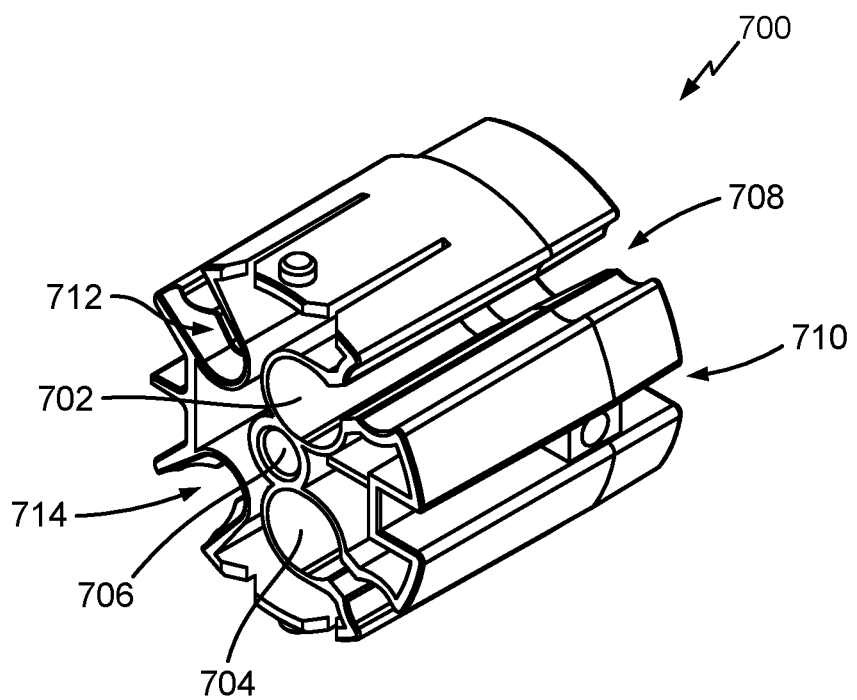

An example implementation of cable support member 176, which may comprise a retainer, for example, referenced herein at 700, is illustrated in FIGS. 7A and 7B, which are axial and perspective views of retainer 700, respectively. As seen, in some instances, retainer 700 may be configured to at least partially retain a plurality of cable assemblies and, as such, may comprise, for example, a plurality of apertures, referenced herein at 702 and 704, such as for respective cable assemblies. Apertures 702 and 704 may, for example, extend through retainer 700 and may be sized to at least partially receive applicable stoppers (e.g., stoppers 166 and 170 of FIG. 6, etc.), as was indicated. As also seen, retainer 700 may further comprise an apertured through-portion 706 so as to slidably receive another cable support member (e.g., cable support member 178 of FIG. 4, etc.), for example, as will be discussed below. Retainer 700 may also include one or more cut-out portions, such as cut-out portions 708 and 710, for example, such as for routing respective cable assemblies towards one or more sources of an electrical signal (e.g., towards power hub housing 116). At times, retainer 700 may also include one or more through-portions or cut-outs, referenced at 712 and 714, which may be grooved, for example, such as for adjustably securing retainer 700 to an outer section of a telescoping assembly (e.g., outer section 138).

Referring back to FIG. 6, as seen, cable support member 174 (e.g., a guiding block) may, for example, be fixedly coupled to cable support member 178, discussed below, via a coupling element 184 so as to engage cable support member 178 for functioning conjointly with inner section 140 during telescoping movements. As also illustrated, coupling element 184 may be matingly received within proximal end 148 of inner section 140, for example, and may abut proximal end 148 so as to slidably extend through apertured portion 186 (e.g., aperture 706 of FIG. 7) of cable support member 176. Coupling element 184 may, for example, be fixedly attached to inner section 140 via any suitable attachment means (e.g., bolts, screws, etc.).

Figure 8:
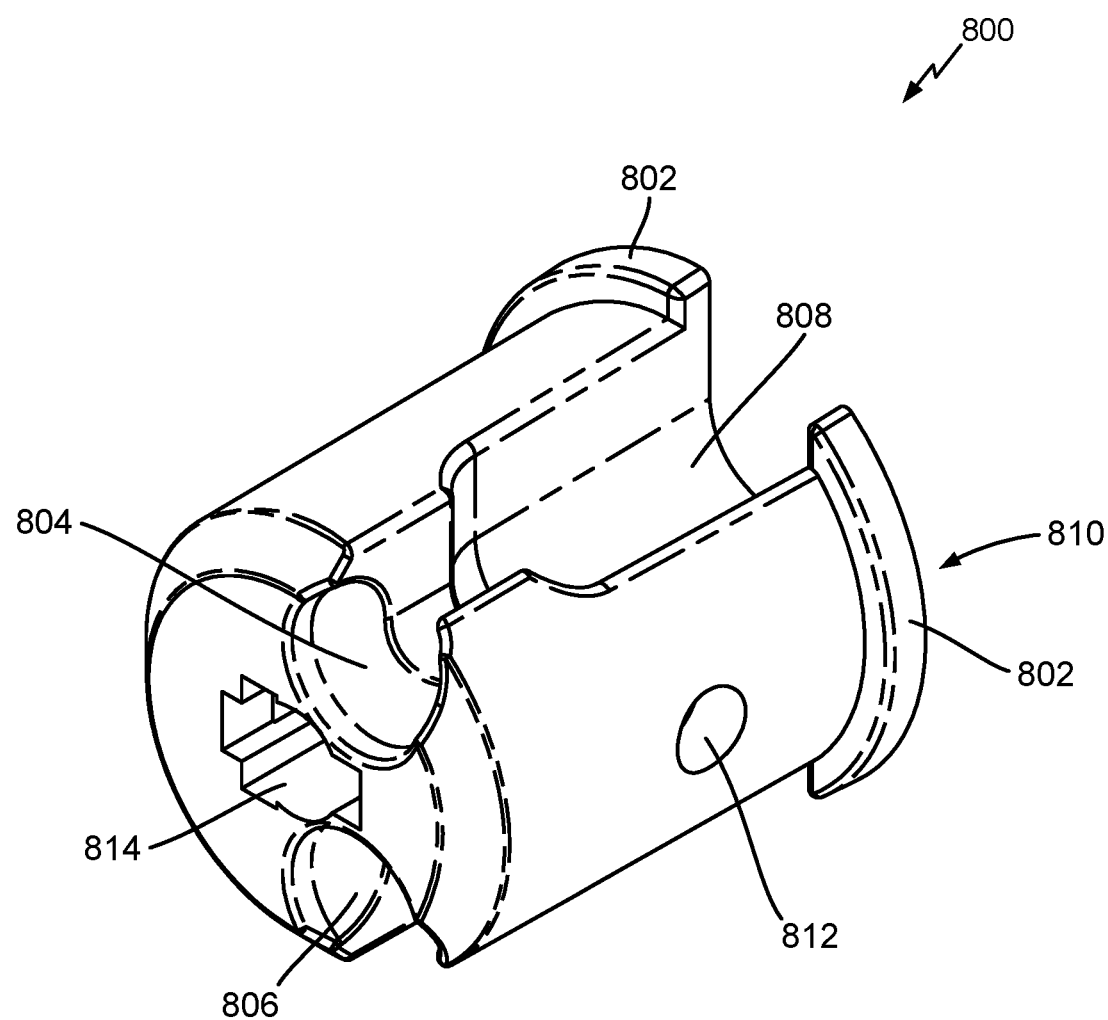
FIG. 8 is a perspective view of an example implementation a cable bushing.

An example implementation of coupling element 184, which may comprise a cable bushing, for example, referenced at 800, is illustrated in FIG. 8, such as via a perspective view. As seen, cable bushing 800 may have a relatively circular cross-section that may be sized to match an inside surface of a particular inner section (e.g., inner section 148 of FIG. 6, etc.) of a telescoping assembly (e.g., telescoping assembly 110 of FIG. 6, etc.), for example. Cable bushing 800 may include, for example, a rimmed portion 802 substantially surrounding one edge of cable bushing 800, such as an edge facing another cable support member (e.g., cable support member 178 of FIG. 6, etc.), as one possible example. Within a particular telescoping assembly (e.g., telescoping assembly 110), rimmed portion 802 may, for example, be sized so as to be seated upon a rim of a particular inner section (e.g., inner section 148 of FIG. 6, etc.) and/or another cable support member (e.g., cable support member 174), if applicable.

Further, in some instances, cable bushing 800 may include one or more apertured portions or cut-outs, illustrated herein at 804, 806, 808, and 810, for example, such as for fixedly retaining at least a portion of an associated cable assembly therewith, such as via applicable stoppers, as was indicated. Cable bushing 800 may also comprise one or more openings or cut-outs, referenced generally at 812, such as for purposes of receiving applicable attachment means, or any portion thereof, so as to secure cable bushing 800 to a particular inner section (e.g., inner section 148 of FIG. 6, etc.) of a telescoping assembly (e.g., telescoping assembly 110 of FIG. 6, etc.) and/or another cable support member (e.g., cable support member 174 of FIG. 6, etc.), for example.

As also illustrated, cable bushing 800 may comprise, for example, a central aperture 814, such as for purposes of fixedly mounting or attaching cable bushing 800 to another cable support member (e.g., cable support member 178 of FIG. 6, etc.). For example, as illustrated in FIG. 4, coupling element 184 (e.g., cable bushing 800 of FIG. 8) may be used, at least in part, to couple inner section 140 to cable support member 178, which may abut proximal end 148 of inner section 140 so as to slidably extend through an apertured portion of cable support member 176 (e.g., aperture 706 of retainer 700 of FIG. 7) and terminate at a free-standing distal end 180. Again, it should be noted that claimed subject matter is not limited to particular implementations shown. For example, a person skilled in the art will appreciate that one or more modifications may be made without deviating from the scope and/or spirit of claimed subject matter.

Figure 9A:
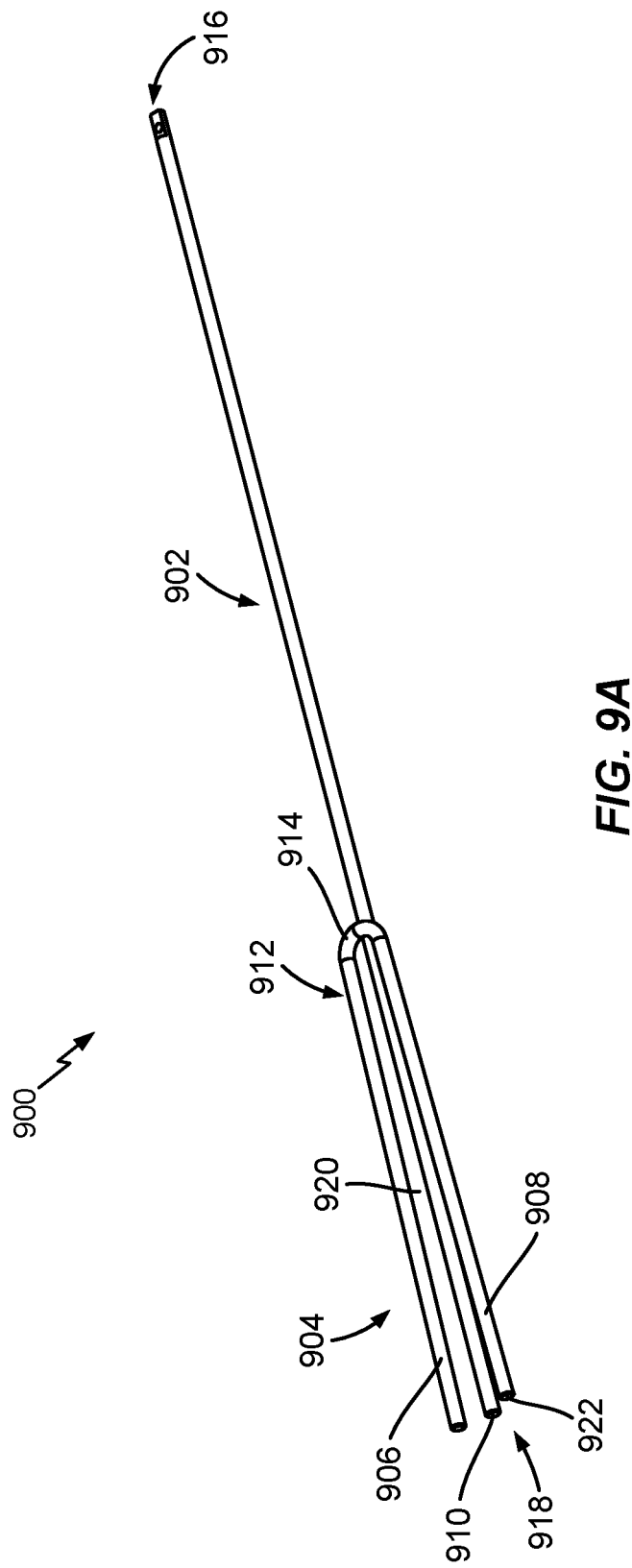

Referring now to FIGS. 9A-C, which are perspective, front, and side views, respectively, of cable support member 178 of FIGS. 4 and 6, according to an implementation. As seen, in some instances, this cable support member may comprise, for example, a cable guide, referenced at 900, having a fork-shaped structure comprising a handle portion 902 and a fork portion 904 having a plurality of tines, referenced at 906, 908, and 910. Depending on an implementation, fork portion 904 may be made separately and mounted on handle portion 902, for example, or may be made integral with handle portion 902, or any combination thereof. For example, as illustrated, fork portion 904 may be formed via fixedly securing a U-shaped segment 912 of fork portion 904 to an extended bar stock or tang of handle portion 902, such as via an arcuate section 914. As also seen, arcuate portion 914 may, for example, smoothly blend or merge into tines 906 and 908, thus, forming U-shaped segment 912. In at least one implementation, tines 906, 908, and 910 may have a substantially circular cross-section, though claimed subject matter is not so limited. U-shaped segment 912 may, for example, be secured to an extended bar stock or tang of handle portion 902 via any suitable attachment means (e.g., by welding, etc.), such as to arrive at a fork-shaped structure.

In an implementation, a proximal end 916 of cable guide 900 may, for example, be adapted for fixedly mounting or attaching cable guide 900 to a suitable telescoping section of a telescoping assembly (e.g., inner section 140 of FIG. 4, etc.), such as via any suitable coupling means (e.g., coupling element 800 of FIG. 8, etc.). As such, in some instances, cable guide 900 may, for example, be capable of functioning conjointly with a particular telescoping section of an associated telescoping assembly (e.g., inner section 140 of FIG. 4, etc.). As was also indicated, cable guide 900 may, for example, have a free-standing distal end, referenced herein via an arrow at 918.

Continuing with the above discussion, in an implementation, tines 906, 908, and 910 may be spaced apart from each other, such as laterally, as one possible example, so as to form one or more longitudinal slots, referenced generally at 920 and 922. In some instances, longitudinal slots 920 and 922 may, for example, be employed for receiving one or more cable assemblies therethrough (e.g., cable assemblies 502 and 504 of FIG. 5). At times, longitudinal slots 920 and 922 may also be capable of retaining at least a portion of one or more cable assemblies, such as via one or more stoppers, as will also be seen. Thus, tines 906, 908, and 910 may, for example, be spaced apart a distance less than a transverse dimension or cross-section (e.g., a diameter, width, etc.) of one or more stoppers arranged to be in contact with tines 906, 908, and/or 910 during telescoping movements. For example, spacing between tines 906, 908, and/or 910 may be sufficient to let a cable body of an associated cable assembly to pass freely through a corresponding longitudinal slot, while detaining one or more stoppers due, at least in part, to their larger transverse dimension or cross-section.

As also illustrated, in some instances, tines 906, 908, and 910 may, for example, be arranged in a slightly triangular disposition, such as with respect to one or more planes, though claimed subject matter is not so limited. For example, in certain implementations, tines 906, 908, and 910 may be arranged substantially laterally and/or parallel throughout their lengths, which is a matter of design choice. Also, cable guide 900 may, for example, be made of any suitable material, such as metal, sufficiently rigid plastic, etc., or any combination thereof, which may also be a matter of design choice. It should be noted that, in one particular implementation, cable guide 900 made of stainless steel was used, though, again, claimed subject matter is not limited in this regard. It should also be appreciated that cable guide 900 may comprise any suitable number of tines, which may depend, at least in part, on a number of routed cable assemblies, a particular telescoping assembly, associated device, implementation, or the like.

Referring back to FIG. 6, as seen, in an implementation, cable support member 178, such as a fork-shaped cable guide, for example, may retain at least a portion of cable assembly 114, such as via stopper 162. Namely, as illustrated, a cable body of cable assembly 114 may be drawn through a longitudinal slot formed by tines 906 and 910, for example, may be and looped upon itself such that stopper 162 is detained between tines 906 and 910, such as at a point proximate to arcuate portion 914, as one possible example. As illustrated, stopper 162 may, for example, be detained by resting against tines 906 and 910, such as due, at least in part, to its larger transverse dimension or cross-section (e.g., a diameter, width, etc.) relative to spacing between tines 906 and 910 defined by a corresponding longitudinal slot, as was previously discussed. In addition, stopper 162, such as in conjunction with stopper 160, for example, may limit bending, twisting, or like motions of second segment 158 of cable assembly 114 during telescoping movements. For example, as seen in this particular implementation, segment 158 may be kept substantially straightened and/or immobilized during telescoping movements of telescoping assembly 110, such as relative to cable support member 178 functioning conjointly with inner section 140. It should be noted that stopper 162 may be arranged on any suitable side and/or portion of a fork portion of cable support member 178. As discussed below, stopper 162 may facilitate bending of a predetermined segment of cable assembly 114, such as segment 164, for example, via a corresponding longitudinal slot in a controlled manner during telescoping movements of telescoping assembly 110.

Figure 10A:
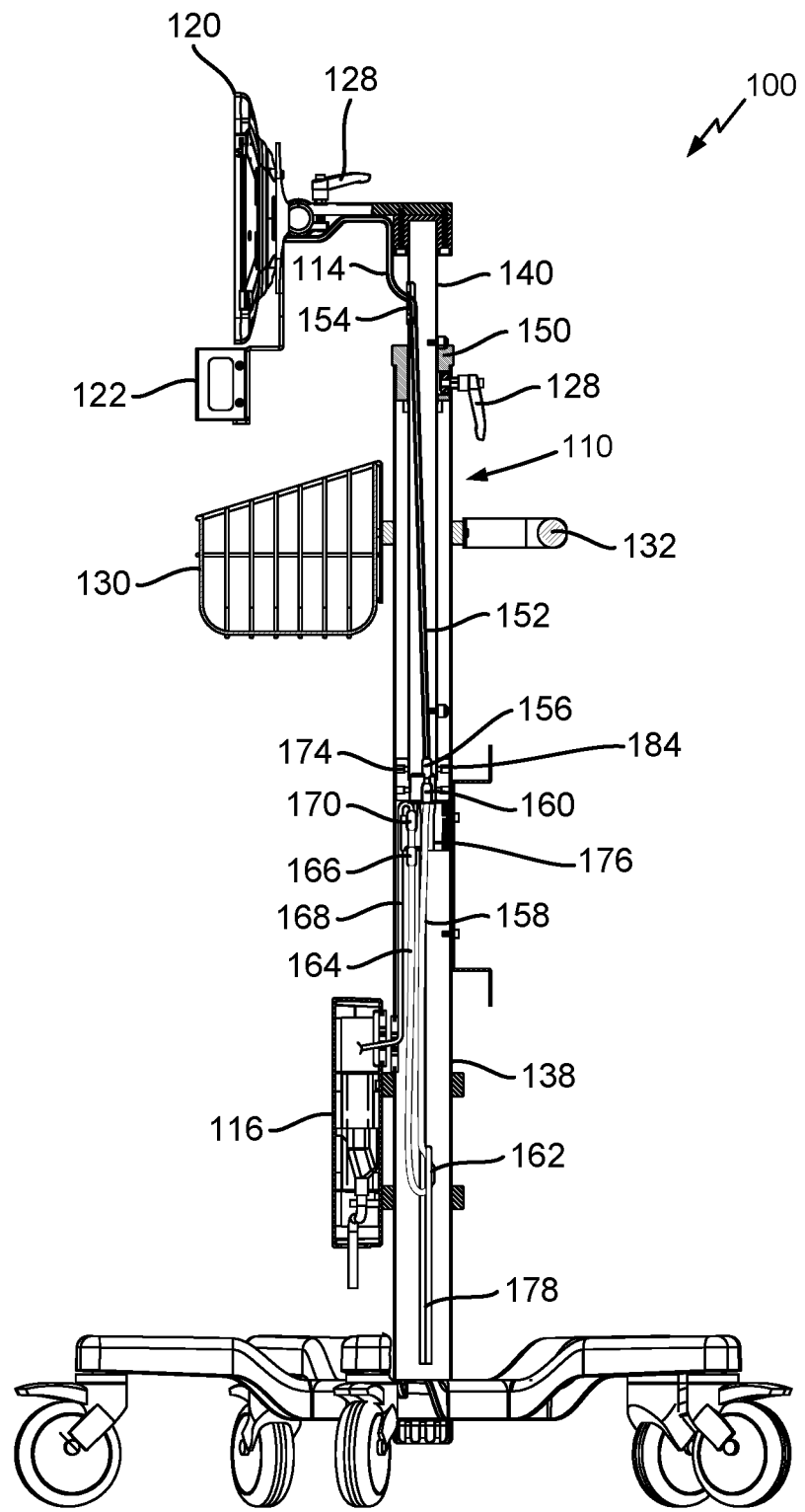
FIGS. 10A-10C are axial cross-sectional views of an example implementation of a telescoping assembly in operative use.
Figure 10B:
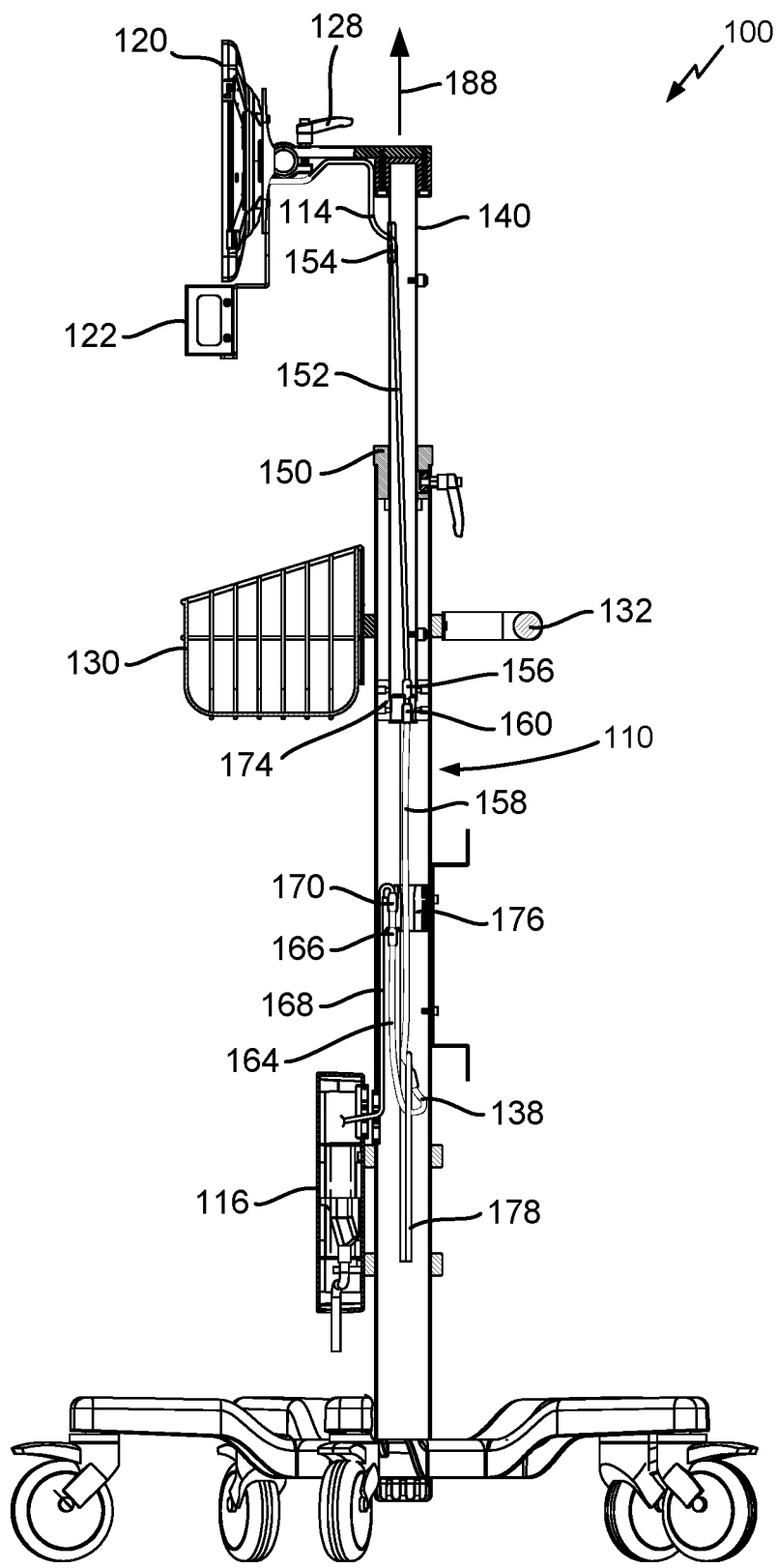
Figure 10C:
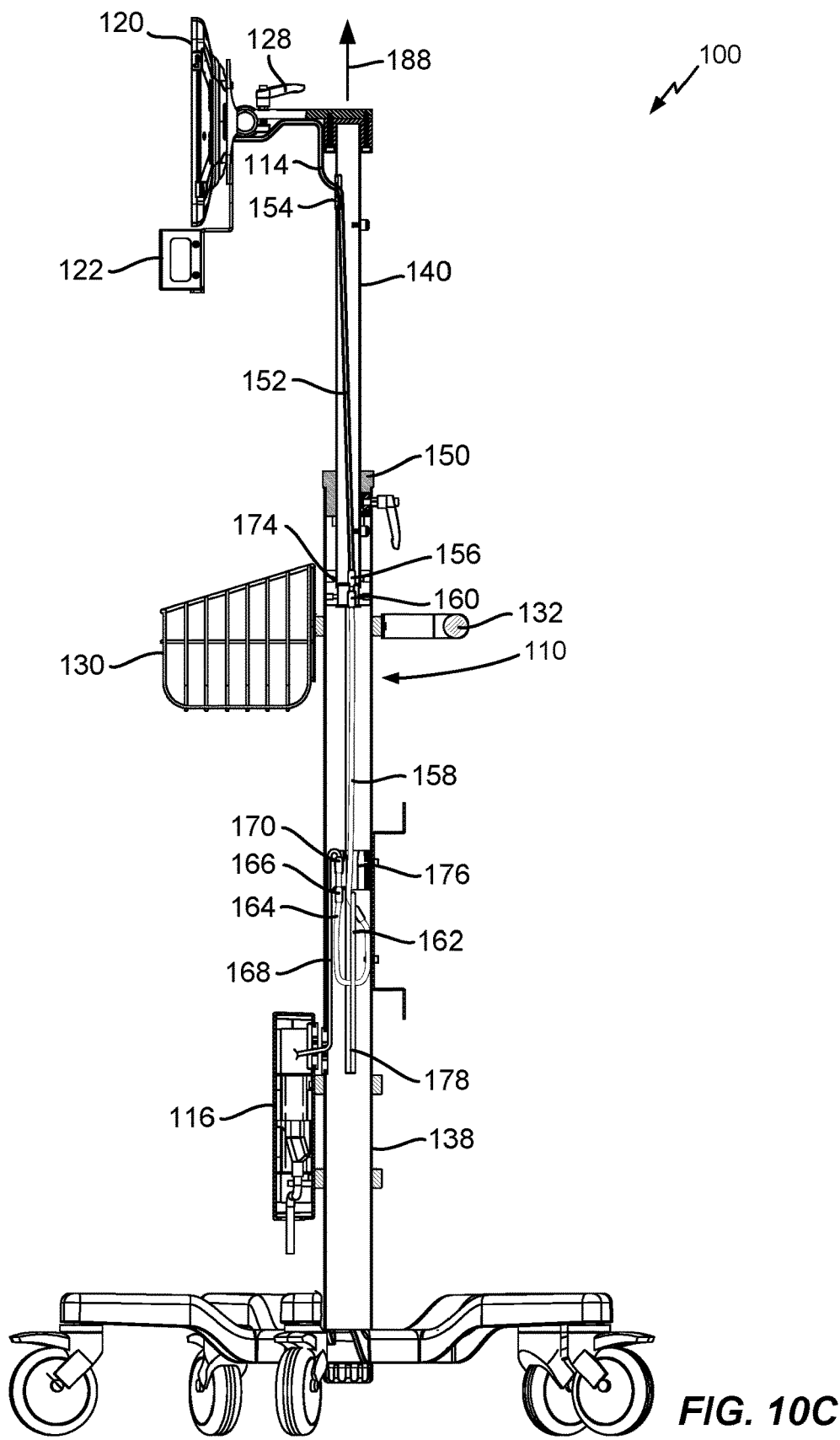

Thus, as illustrated progressively in FIGS. 10A-10C via axial cross-sectional views of an example implementation of a telescoping assembly associated with a cart, such as telescoping assembly 110 associated with VRI cart 100, for example, in operative use, inner section 140 may be pulled up or extended from its retracted position (e.g., FIG. 10A) towards its extended position (e.g., FIG. 10C), such as for one or more suitable adjustments. As inner section 140 extends, as referenced schematically via an arrow at 188, cable support members 154, 174, and 178, being fixedly attached to inner section 140 via suitable attachment means, such as discussed above, for example, may move synchronously with inner section 140. Since particular segments of cable assembly 114, such as segments 152 and 158, for example, are fixed in relative positions via applicable cable support members functioning conjointly with inner section 140, as also discussed above, these segments may also move synchronously with inner section 140. As such, as illustrated in this particular example, segments 152 and 158 may remain substantially straightened and/or immobilized during telescoping movements of telescoping assembly 110, such as during upward movement 188, for example. At times, this may, for example, limit bending, twisting, or like motions of these segments and, as such, prevent or reduce damage to cable assembly 114, as was also indicated. As also seen, segment 168 may, for example, remain substantially stationary during telescoping movements, such as by virtue of being anchored to outer section 138 and also fixedly secured to cable support member 176, such as via stopper 170, which may also prevent or reduce associated damage.

As particularly seen in FIG. 10C, cable support member 178 (e.g., cable guide 900 of FIG. 9) may be in a looped relation with a particular segment of cable assembly 114, such as segment 164, for example, so at to facilitate bending of segment 164 in a controlled manner. This may, for example, be implemented, at least in part, via directing or guiding a cable body of segment 164 to travel (e.g., move, slide, etc.) along and/or loop though a longitudinal slot formed by applicable tines of an associated fork portion (e.g. longitudinal slot 920 and/or 922 of FIGS. 9A and 9B, etc.), such as due, at least in part, to gravity, resilient nature of an associated cable body, or the like. As such, here, a particular predetermined segment of a plurality of segments of a cable assembly may, for example, be bendable during telescoping movements. By way of example but not limitation, in a particular implementation shown, only segment 164 may, for example, be bendable during telescoping movements of telescoping assembly 110, such as illustrated via upward movement 188. A length of a longitudinal slot formed by applicable tines may, for example, be sized appropriately, such as to prevent disengagement or slippage of segment 164 from a free-standing end of a fork portion (e.g., end 918 of FIGS. 9A-C) of cable support member 178. For example, a length a particular longitudinal slot may be selected to be longer than a length of a chord or like segment of a looped portion of a cable assembly, which may be measured while an inner portion of a telescoping assembly is fully extended. Claimed subject matter is not so limited, of course. Any other suitable approaches may be utilized herein so as to prevent disengagement or slippage of segment 164 from cable support member 178. For example, in some instances, segment 164 may be attached or secured to a fork portion of cable support member 178 via a tie wrap or like cable tie.

Accordingly, as was indicated, a cable management system for a telescoping assembly, such as disclosed herein, may provide benefits. For example, by having a particular predetermined segment of a cable assembly bend in a controlled manner, a likelihood of the cable assembly being caught by surrounding edges, walls, etc. of the interior and, thus, associated cable damage may be eliminated or reduced. In addition, guiding a cable assembly to travel and/or loop in a controlled manner during telescoping movements, such as via a longitudinal slot may, for example, prevent or reduce cable twisting, entanglement, or the like. As such, a service life and/or operation of a particular device (e.g., VRI cart 100, etc.) and/or associated telescoping assembly may, for example, be extended. Of course, such a description of certain aspects of a cable management system for a telescoping assembly and its benefits is merely an example, and claimed subject matter is not so limited.

References throughout this specification to one implementation, an implementation, one embodiment, an embodiment and/or the like means that a particular feature, structure, and/or characteristic described in connection with a particular implementation and/or embodiment is included in at least one implementation and/or embodiment of claimed subject matter. Thus, appearances of such phrases, for example, in various places throughout this specification are not necessarily intended to refer to the same implementation or to any one particular implementation described. Furthermore, it is to be understood that particular features, structures, and/or aspects described are capable of being combined in various ways in one or more implementations and, therefore, are within intended claim scope, for example. In general, of course, these and other issues vary with context. Therefore, particular context of description and/or usage provides helpful guidance regarding inferences to be drawn.

In the drawings and/or description, as was indicated, like parts and/or features are typically marked throughout the specification and/or drawings with the same reference numerals, respectively, if applicable. Again, the drawing figures are not necessarily to scale. Certain features of the invention may be shown exaggerated in scale or in somewhat schematic form and some details of conventional elements may not be shown in the interest of clarity and conciseness. Specific embodiments are described in detail and are shown in the drawings, with the understanding that the present disclosure is to be considered an exemplification of the principles of the invention, and is not intended to limit the invention to that illustrated and described herein. It is to be fully recognized that the different teachings of the embodiments discussed herein may be employed separately or in any suitable combination to produce desired results.

While there has been illustrated and described what are presently considered to be example features and/or aspects, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of the appended claims, and equivalents thereof.

The terms, "and", "or", "and/or" and/or similar terms, as used herein, include a variety of meanings that also are expected to depend at least in part upon the particular context in which such terms are used. Typically, "or" if used to associate a list, such as A, B or C, is intended to mean A, B, and C, here used in the inclusive sense, as well as A, B or C, here used in the exclusive sense. In addition, the term "one or more" and/or similar terms is used to describe any feature, structure, and/or characteristic in the singular and/or is also used to describe a plurality and/or some other combination of features, structures and/or characteristics. Likewise, the term "based on" and/or similar terms are understood as not necessarily intending to convey an exclusive set of factors, but to allow for existence of additional factors not necessarily expressly described. Of course, for all of the foregoing, particular context of description and/or usage provides helpful guidance regarding inferences to be drawn. It should be noted that the following description merely provides one or more illustrative examples and claimed subject matter is not limited to these one or more examples; however, again, particular context of description and/or usage provides helpful guidance regarding inferences to be drawn.

What is claimed is:

1. A cable management system for a telescoping assembly, comprising:
   an outer section;
   an inner section slidably mounted in the outer section for telescoping movements, the outer and the inner sections having respective proximal and distal ends, the proximal end of the inner section being received in the distal end of the outer section; and
   a cable assembly routed through the outer and the inner sections, the cable assembly having a plurality of segments and being retained via cable support members arranged within the telescoping assembly such that a predetermined segment of the plurality of segments is bendable during the telescoping movements; and
   wherein at least some of the cable support members comprise:
      a retainer fixedly mounted to an inside surface of the outer section at a distance from a first guiding block retainably housed in the distal end of the outer section; and a second guiding block fixedly mounted to an outside surface of the inner section proximate the proximal end of the inner section so as to travel between the first guiding block and the retainer during the telescoping movements.

2. The cable management system of claim 1, wherein the predetermined segment comprises a segment drawn through a cable support member in looped relation.

3. The cable management system of claim 1, wherein one or more of the plurality of segments remain substantially stationary relative to the inner section during the telescoping movements.

4. The cable management system of claim 1, wherein the plurality of segments have respective lengths defined via one or more of the cable support members and one or more stoppers fixedly disposed on the cable assembly.

5. The cable management system of claim 1, wherein the cable support members are adapted to conduct the cable assembly therethrough, one or more of the cable support members being further adapted to fixedly retain the cable assembly via respective apertures sized to at least partially receive one or more stoppers fixedly disposed on the cable assembly.

6. The cable management system of claim 1, wherein the second guiding block is fixedly coupled to a cable support member for functioning conjointly with the inner section during the telescoping movements.

7. The cable management system of claim 6, wherein the cable support member comprises a cable guide fixedly coupled to the second guiding block via a coupling element.

8. The cable management system of claim 7, wherein the cable guide is matingly received in the proximal end of the inner section so as to abut the inner section to slidably extend through an apertured portion of the retainer.

9. The cable management system of claim 7, wherein the cable guide comprises a fork-shaped structure having a handle portion and a fork portion extending from the handle portion to terminate at a free-standing distal end.

10. The cable management system of claim 9, wherein the fork portion comprises a plurality of tines forming at least one longitudinal slot for receiving the cable assembly therethrough.

11. The cable management system of claim 10, wherein the at least one longitudinal slot facilitates bending of the predetermined segment in a controlled manner during the telescoping movements.

12. The cable management system of claim 10, wherein the at least one longitudinal slot is sized to prevent disengagement of the cable assembly from the fork portion.

13. The cable management system of claim 10, wherein the cable assembly comprises a stopper arranged to be in contact with a predetermined side of the fork portion and being sized to limit movement of the stopper through the at least one longitudinal slot.

14. The cable management system of claim 1, wherein at least some of the cable support members comprise a first retainer adapted to anchor the cable assembly to the inner section and a second retainer adapted to anchor the cable assembly to the outer section.

15. The cable management system of claim 14, wherein the first and the second retainers have respective openings to allow the cable assembly to extend therethrough so as to connect to the cable assembly to one or more sources of an electrical signal.

* * * * *